United States Patent [19]

Harris et al.

[11] Patent Number: 4,716,739

[45] Date of Patent: Jan. 5, 1988

[54] CARRIAGE OF COMESTIBLES AND IN PARTICULAR TO CONTAINERS AND RELATED MEANS AND METHODS SUITABLE FOR SUCH PURPOSES

[75] Inventors: Samuel Harris, Takapuna; John R. Lovegrove, Remuera, both of New Zealand

[73] Assignee: The 501 Shipping Corporation of New Zealand, New Zealand

[21] Appl. No.: 915,632

[22] Filed: Oct. 6, 1986

Related U.S. Application Data

[60] Division of Ser. No. 811,704, Dec. 20, 1985, Pat. No. 4,642,996, which is a continuation of Ser. No. 641,537, Aug. 16, 1984, abandoned.

[30] Foreign Application Priority Data

Sep. 1, 1983 [NZ] New Zealand .................. 205453
Aug. 13, 1984 [NZ] New Zealand .................. 205453

[51] Int. Cl.$^4$ ................................................ F24F 3/16
[52] U.S. Cl. ............................. 62/78; 220/88 B; 426/418
[58] Field of Search ............ 426/418, 419, 8; 62/62, 62/78; 220/88 B

[56] References Cited

U.S. PATENT DOCUMENTS

| | | | |
|---|---|---|---|
| 3,102,777 | 9/1963 | Bedrosian et al. | 62/78 |
| 3,102,779 | 9/1963 | Brody et al. | 62/78 |
| 3,102,780 | 9/1963 | Bedrosian et al. | 62/78 |
| 3,239,360 | 3/1966 | Dixon | 62/64 |
| 3,307,618 | 3/1967 | Hagenauer et al. | 165/27 |
| 3,360,380 | 12/1967 | Bedrosian | 426/312 |
| 3,508,881 | 4/1970 | Hagenauer et al. | 422/64 |
| 3,830,078 | 8/1974 | Read | 62/78 |
| 4,142,372 | 3/1979 | Keto et al. | 62/78 |
| 4,537,043 | 8/1985 | Volker et al. | 62/78 |

FOREIGN PATENT DOCUMENTS 143880 11/1968 New Zealand .

OTHER PUBLICATIONS

"CO$_2$-Absorber zur Lagerung von Apfeln unter Kontrollicter Atmosphare", from *Technische,* Rundschau Sulzer (1966), pp. 100-102.

*Primary Examiner*—Ronald C. Capossela
*Attorney, Agent, or Firm*—Kendrick, Netter & Bennett

[57] ABSTRACT

A method and means for transporting a quantity of comestibles (preferably at lowered temperatures) where at least continual monitoring of at least the oxygen level of the atmosphere to which the comestible is subjected is carried out. Preferably the carbon dioxide level is also monitored. Automatic adjustment of the oxygen content and carbon dioxide content in response to the monitoring is carried out using a positive infusion of ambient air and the scrubbing of the gas atmosphere to which the comestibles are subjected respectively. Ideally the comestibles are of a respiring nature such as would be the case with plants (whether cut or uncut), fruit and vegetables and they are carried in a container suitable for shipping where a seal of the container sufficient to ensure that less oxygen from the ambient air can diffuse into the container than is required for respiration by said quantity and sufficient to ensure a product of carbon dioxide by said quantity as a result of respiration than can diffuse from the container.

7 Claims, 13 Drawing Figures

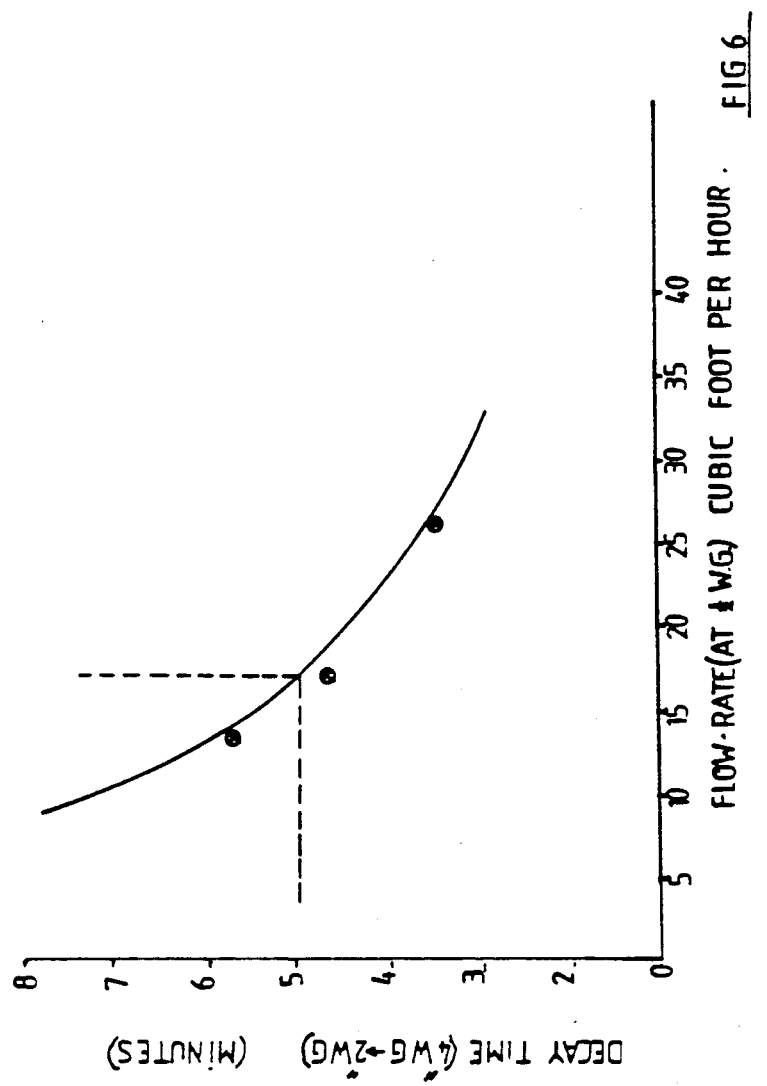

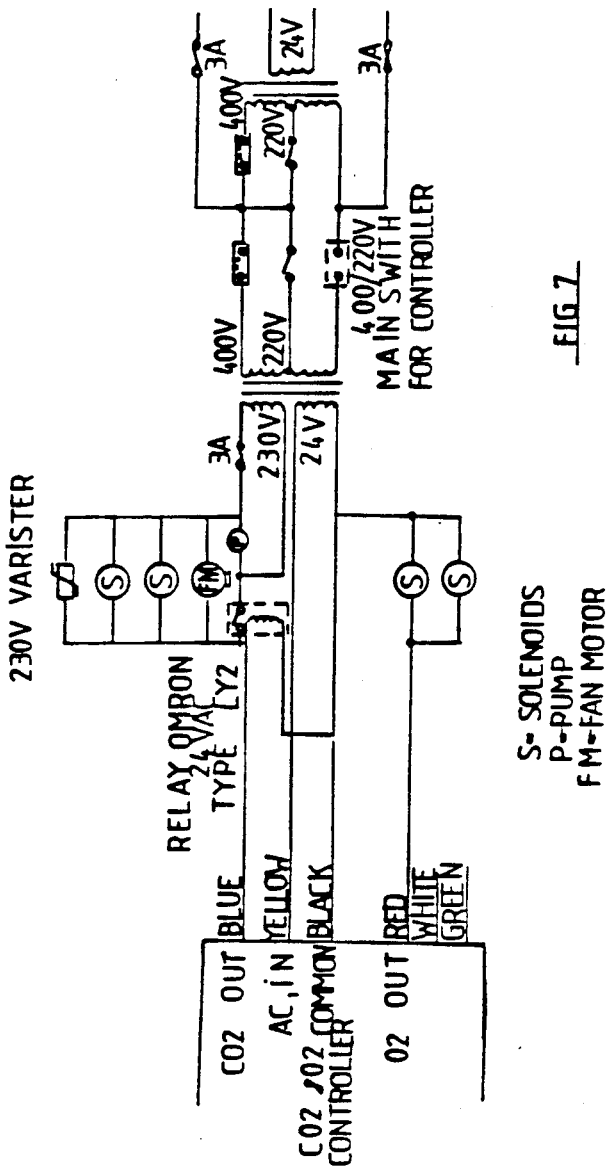

CARRIAGE OF COMESTIBLES AND IN PARTICULAR TO CONTAINERS AND RELATED MEANS AND METHODS SUITABLE FOR SUCH PURPOSES

This application is a division of U.S. patent application Ser. No. 811,704, now U.S. Pat. No. 4,642,996 which was a continuation of U.S. patent application Ser. No. 641,537, filed Aug. 16, 1984, now abandoned.

The present invention relates primarily to improvements in and/or relating to the carriage of comestibles and/or plants whether cut or not and in particular to containers (eg. of the sea transport type) and related means and methods suitable for such purpose.

Many countries because of their geographical position are in an unenviable position owing to the large distance over which comestibles must be shipped and many of the answers that deal with the shorter passages involved in freighting, for example, fruit and/or vegetables are not always appropriate.

With many foodstuffs and in particular we refer to fruit and vegetables and indeed even meats there is a desire to avoid freezing so as not to lower the quality of the end product in the hands of the ultimate consumer and while air freighting is an answer in relation to highly valued food items it is not appropriate for most bulk food items. In any event if an alternative form of freighting was available without detracting from the quality of the comestible such alternative would no doubt be cheaper than air freighting and be able to carry greater volumes.

It is therefore an object of the present invention to provide means and/or methods which will go at least some way to meeting the above mentioned desiderata or which will at least provide the public with a useful choice.

Attempts have been made in the past to provide systems which go at least some way to overcoming the difficulties but which of themselves are not totally appropriate for the longer distances where the comestibles must be maintained for much longer periods. Some systems taken into account that certain fruits or vegetables can be sustained for longer than usual periods at non-freezing but nevertheless refrigerated temperatures when maintained at an atmosphere considered conducive for the preservation of the fruit, vegetable, fish, meat or plants during shipping.

One such system is known as the "NITROL" system. In this respect we refer to U.S. Pat. No. 3,239,360. This system relies on an ability to periodically purge the atmosphere with nitrogen based on controls which respond to the oxygen level within the environment of the shipping container. The only control therefore is based on oxygen level and a stopping and starting of a nitrogen purge system using liquid nitrogen in a container designed to allow leakage of gas. Such a system if used for very long shipping distances would required very large quantities of nitrogen.

Another system that has been available is the "TECTROL" system which has been known since about 1960 and has been associated with Transfresh Corporation of the United States. This system relies on a sealing of the container using a seal inside of the container doors. The environment is then flushed with a premixed gas (trade name "TECTROL"). This system differs from the NITROL system in that there is no monitoring or control of the environment during shipping other than of course in respect of temperature. The balance between oxygen and carbon dioxide which is critical to the well-being of fruit and/or vegetables is controlled rather arbitrarily by inserting into the container prior to its being sealed quantities of hydrated lime to absorb excessive amounts of carbon dioxide. Since the comestible can be ruined if there is not sufficient oxygen a bleed hole in the container (normally in a flushing valve) is provided to prevent oxygen depletion as a result of the respiration of the product which converts oxygen within the environment into carbon dioxide. The carbon dioxide and oxygen control is not rigidly controlled to a pre-set level.

It should be realised that fruit and vegetables require oxygen if they are to remain fresh since fruit and vegetables continue to respire after harvest. It is the aim of the present invention to make them live more slowly in a controlled low oxygen atmosphere and preferably with control of at least one other gas. It should be appreciated that with the shipping of fresh meat or fish the flesh is dead and does not respire i.e. does not have an oxygen requirement. However, modification of the gaseous atmosphere by reducing the oxygen content and increasing the carbon dioxide content with respect to normal atmospheric air, enhances the qualities of chilled meat and fish. Live plants (whether potted or cut) respire and hence similar factors arise.

The present invention relates to a method of transporting which has application for not only long distance transportation but also for shorter distance transportation where the quality of the comestible is a prime factor. The present invention has advantage over preexistence systems in that 1. Conventional shipping containers can be used with only a minimum of modification 2. While flushing at a loading station with a gas high in nitrogen can be carried out where a low oxygen environment is required there is no necessity for the provision of gas bottles with the container since oxygen control in transit is controlled by the infusion of ambient air under the control of an oxygen monitor and the carbon dioxide level is controlled by a scrubber under the control of a monitor and 3. It is not necessary to provide a complete seal of the environment—it merely being necessary to ensure the leakage route is not such as to allow the unforced infusion of ambient air into the environment so as to provide more oxygen than is required by the comestibles and preferably also to ensure the loss of atmosphere through such leakage route of carbon dioxide from the container environment is not at a rate greater than is produced by the comestibles.

Accordingly in one aspect the present invention consist in a method of transporting a quantity of a respiring comestible selected from plants, fruit and vegetables comprising the steps of loading the quantity of respiring comestible into a container sealing the container sufficient to ensure that less oxygen from ambient air can diffuse into the container than is required for respiration by said quantity and sufficient to ensure a production of carbon dioxide by said quantity as a result of respiration than can diffuse from the container, flushing the container with a nitrogen rich gas to reduce the oxygen level in the container atmosphere (if, in fact, the oxygen level requies lowering) and transporting the container including the quantity of respiring comestible while monitoring the temperature, carbon dioxide and oxygen levels within said container and adjusting as necessary the temperature by refrigeration in response to such monitoring towards an optimum or predetermined value or range of values, the oxygen content by positive infusion of ambient air into the container in response to such monitoring towards an optimum or predetermined value of range of values and the carbon dioxide content by absorbing carbon dioxide from the atmosphere in the container in response to such monitoring towards an optimum or predetermined value or range of values.

In a further aspect the present invention consist in a shipping container capable of being substantially sealed against a substantial infusion of ambient air and including a monitoring system for monitoring the oxygen content of its substantially sealed atmosphere and means automatically responsive to said monitoring system for providing a positive infusion of ambient air into the environment of the container in order to raise the oxygen content therein should it fall periodically beyond a predetermined value.

Preferably there is provided a monitoring system for carbon dioxide content of the atmosphere within the container and means for automatically providing a scrubbing out of carbon dioxide from the atmosphere within the container from time to time as the carbon dioxide content rises above a predetermined value within the substantially sealed gas environment notwithstanding any influx of air as a consequence of the oxygen content control.

Preferably a temperature monitoring system for the enviornment and/or atmosphere of the container is provided and means provided responsive to the monitoring system to lower the temperature.

In yet a further aspect the invention consists in a shipping container which includes a monitoring system for carbon dioxide within its sealed or substantially sealed gas environment and has means for automatically providing a positive movement of gas in the environment through a carbon dioxide scrubber.

In still a further aspect the invention consist in a shipping container having a quantity of respiring comestibles selected from plants, fruit and vegetables disposed therein and sealed therein sufficient to ensure that less oxygen from the ambient air can diffuse into the container than is required for respiration by said quantity and sufficient to ensure a production of carbon dioxide by said quantity than can diffuse from the container, means to monitor the temperature of the environment within said container, means to monitor oxygen content within the container, means to monitor the carbon dioxide content within the container, means responsive to the means to monitor the temperature of the environment within the container to adjust at least downwardly the temperature of the environment towards a predetermined value, means responsive to the means to monitor the oxygen content within the environment of the container to cause a positive infusion of ambient air into the container should the oxygen level within the environment fall below a predetermined value and means responsive to the means to monitor the carbon dioxide within the environment to cause the passage of gas within the environment through means to scrub at least some carbon dioxide from the atmosphere of the environment should it rise above a predetermined value.

In yet a further aspect the present invention consist in a method of transporting a quantity of a respiring comestible selected from plants, fruit and vegetables comprising the steps of loading the quantity of respiring comestible into a container sealing the container sufficient to ensure that less oxygen from ambient air can diffuse into the container than is required for respiration by said quantity and sufficient to ensure a production of carbon dioxide by said quantity as a result of respiration than can diffuse from the container, flushing the container with a nitrogen rich gas to reduce the oxygen level in the container atmosphere and tranporting the container including the quantity of respiring comestible while at least continually monitoring the temperature, carbon dioxide and oxygen levels within said container and adjusting as necessary the temperature without freezing the quantity by refrigeration in response to such monitoring towards an optimum or predetermined value or range of values, the oxygen content by positive infusion of ambient air into the container in response to such monitoring so as to maintain an oxygen content in the range of 1% to 10% by volume the carbon dioxide content by absorbing carbon dioxide from the atmosphere in the container in response to such monitoring so as to maintain an oxygen content in the range of 0%–10% by volume.

One preferred form of the present invention will now be described with reference to the accompanying drawing in which:

FIG. 1 is a plan diagrammatic view of a shipping container in accordance with the present invention, the left hand end showing the zone which would include the control systems and include of course the refrigeration system, the right hand end showing a door seal such as is used by Transfresh Corporation and the crosses denoting an ingress and egress flushing valve substantially of a kind as is used by Transfresh Corporation save however that no bleed hole is associated therewith, FIGS. 2A and 2B each show an elevation view of the container as depicted in FIG. 1 showing diagrammatically the air circulation which occurs within the container as a consequence of the pressure differential caused over the evaporator (E) caused by the fan which is therebelow or thereabove, the air leaving (in FIG. 2A) (or alternatively entering as shown in FIG. 2B) the evaporator zone using the fluted floor which provides ducting under the load (not shown) and of course the gap above the load within the container, FIG. 3 is a diagrammatic view showing how in the preferred system in accordance with the present invention the pressure differential across the evaporator can be employed to not only provide the sampling of the environment to the controller which in the preferred form of the present invention controls both oxygen and carbon dioxide levels but also can provide the positive infusion of air into the environment when valves above and below the evaporator are provided, FIG. 4 shows in a more simplified form the arrangement of FIG. 3 when the oxgen controller indicates that the oxygen level is unacceptably low and an infusion of air is desired to raise the oxygen level, FIG. 5 is a diagrammatic view of one form of arrangement to scrub carbon dioxide (or other gases) from the environment under the action of a separate fan and valves to that depicted in FIGS. 3 and 4, it being appreciated however that scrubbing with, for example, hydrated lime can occur even under that pressure differential if desired, FIG. 6 is a graph for a range of standard 21 foot shipping containers showing pressure decay time due to leakage expressed in minutes (for the pressure differential between the starting pressure within the container and atmospheric pressure to decay by half) against actual leakage rate (at normal ambient temperatures and at a half inch water gauge pressure) in cubic feet per hour and, FIG. 7 is a diagram of preferred container wiring, FIG. 8A and 8C refers to the preferred carbon dioxide controller circuit diagram.

FIG. 8B refers to the preferred oxygen controller circuit diagram.

The present invention differs from the systems that have previously been used in that there is a positive automatic control of the oxygen and preferably the carbon dioxide content. Existing systems do not provide positive automatic control effective over an extended shipping period. Preferred percentages for specific fruits, vegetables, meat, fish and plants are normally in the vicinity of 1–10% by volume oxygen and 0–10% by volume carbon dioxide in order to enhance freshness at the end of shipping.

Figure 1:
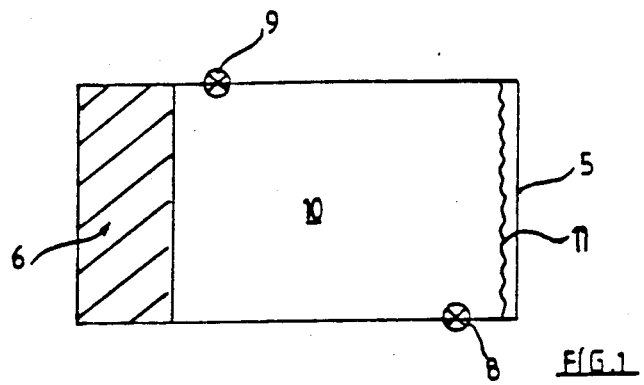
Figure 2B:
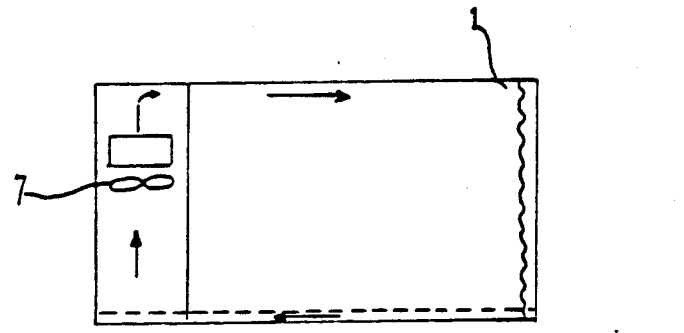
Figure 2A:
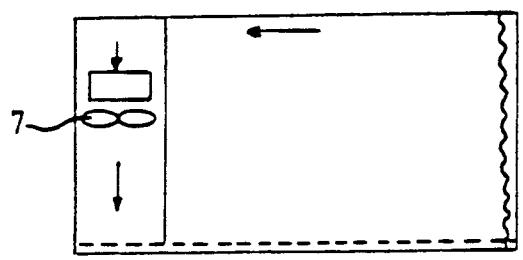
Figure 5:
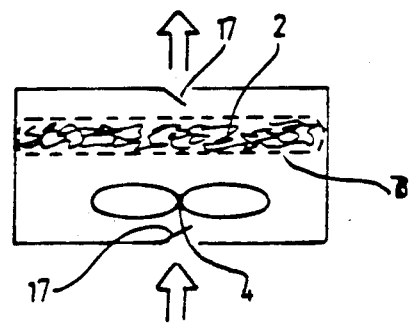

With this system in accordance with the present invention it is envisaged that a container would be provided to a grower who wishes to pack his fruit or vegetables. It is envisaged that when supplied the carbon dioxide scrubbing unit, as depicted in FIG. 5, would be positioned at zone 1 or thereabouts in FIGS. 2A or 2B. The unit shown very simply in FIG. 5 includes a bag, layer or the like of hydrated lime 2 over a support medium 3 which bag and/or support is previous to air and above a fan or the like 4 with electrically operated control valves or the like 17. The supplier would then load his fruit, vegetables, meat, fish or plants and activate the refrigeration unit just before and/or after having closed the doors 5. The refrigeration unit is provided in the zone 6 and indeed the evaporator E forms part of the refrigeration unit as also does the fan 7.

The containers would then be moved promptly to a shipping depot where using an ingress port 8 and an egress port 9 the environment within the storage space 10 which includes the vegetables and/or fruit and/or meat and/or fish and/or plants would then be flushed by a gas high in nitrogen and low in oxygen so as to lower the oxygen content towards the desirable level. Obviously before such flushing a sealing curtain 11 would be inserted. Such a sealing curtain would be as impermeable to gas movement therethrough as possible. If desired, carbon dioxide gas would then be added to the container to the predetermined level through ports 8 and 9.

After flushing the environment would then be controlled by the controller 12 which samples preferably from an intake 13 and discharges the sample back out at 14.

The controller preferably is a controller of both oxygen and carbon dioxide. Preferably the combined oxygen-carbon dioxide tester is removable from the unit so as to ensure that in those circumstances when it is not required it can be used with other containers. Ideally the combined tester is one as supplied by G.F.G. of West Germany. If however only an oxygen control is to be utilised or if the oxygen controller is to be separate from the carbon dioxide controller preferably the controller is either a "TELEDYNE" portable oxygen analyser or one supplied by Beckman of the United States. A separate carbon dioxide controller is available from G.F.G. of West Germany.

Figure 10:
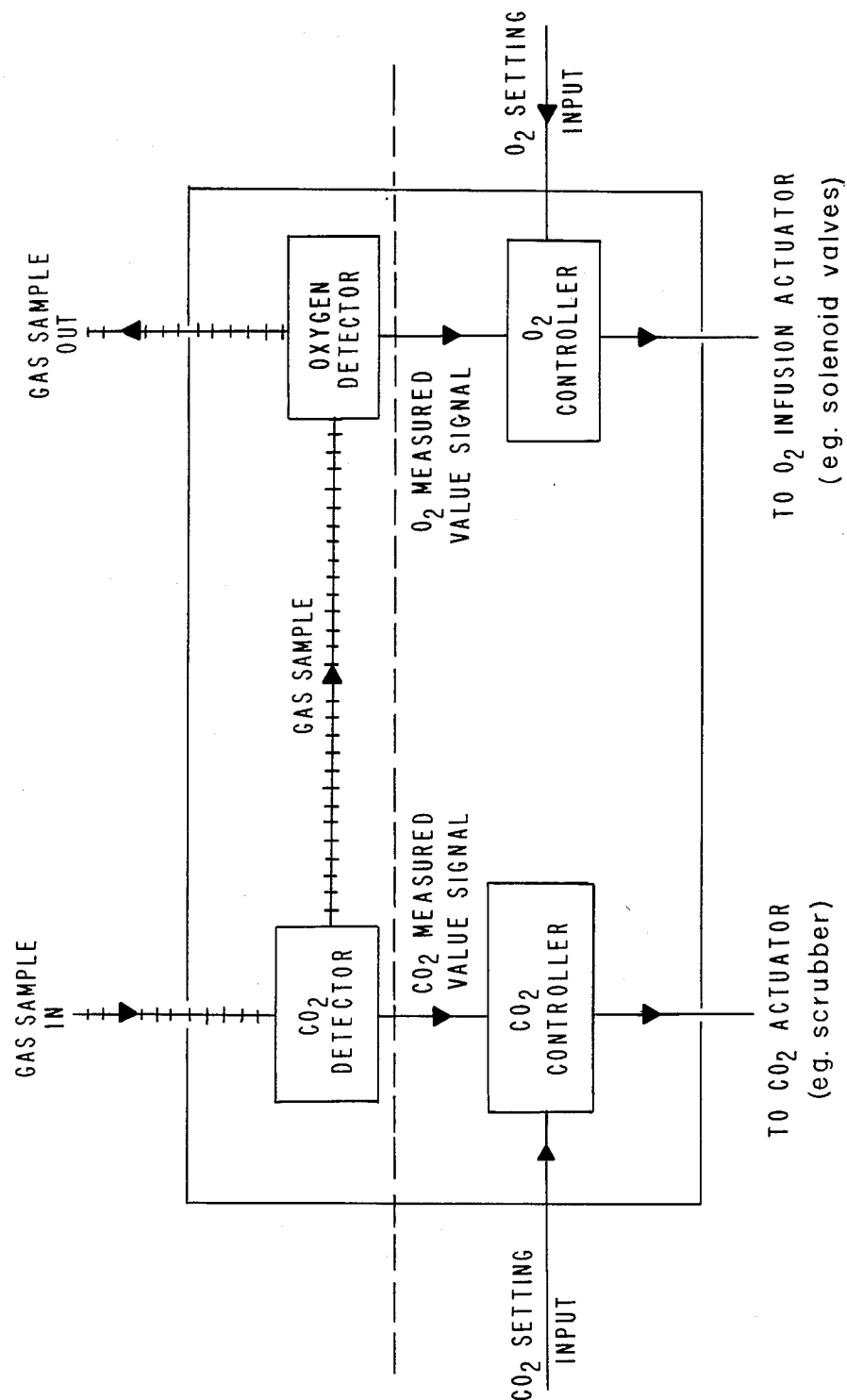
FIG. 10 is a block diagram of the overall control system.

In FIG. 10 there is shown bounded by the rectangular outline (indicative of a single apparatus) various flow control and functional aspects of the overall controlling system. The broken line serves the purpose of separating the added functions desirable for the performance of the present invention to the function of existing combined testers such as supplied by G.F.G. of West Germany. Above the broken line are shown functions of the G.F.G. tester. In such a combined tester it can be seen that a gas sample is brought into a carbon dioxide detector within the overall apparatus and a measured value signal indicative of the $CO_2$ level is given as an output. The gas sample then passes from the carbon dioxide detector to the oxygen detector before being returned to the environment from which it came or being discharged to waste. The oxygen detector has as an output a measured value signal indicative of the oxygen level.

Modifications to the combined tester previously described are shown below the broken line in FIG. 10. These comprise the provision of a carbon dioxide controller which is to receive not only the input of the output measured value signal from the carbon dioxide detector but also a setting input whereby a manual entry can be made of a desired carbon dioxide value. The carbon dioxide controller would incude a logic capability which would enable it to compare the measured and the manually set desired value. The measured carbon dioixde value signal is compared to the desired value. If the actual measured carbon dioxide value is above the desired value a signal is then sent to the carbon dioxide scrubber to scrub the atmosphere within the container. Repeated comparisons would continue to be made. When the carbon dioxide value measured is below the desired value no signal is sent. It can be seen that there is therefore a simple means of actuation for example a fan or valves associated with a carbon dioxide scrubber.

Likewise the oxygen controller compares the measured value signal indicative of oxygen level against the oxygen desired setting input and in this case if the actual measured oxygen level is below the desired value the controller sends a signal to the oxygen infusion actuator which in the preferred form of the present invention are solenoid valves which can be opened. If the oxygen is above the desired value no signal is sent and in such a circumstance the solenoid valves remain closed, or if they had previously been opened, are closed.

It seems desirable therefore to provide a purpose built machine which embodies not only the existing components of a combined tester as indicated above the broken line in FIG. 10 but also the additional controller functions described in relation to FIG. 10.

A purpose built $CO_2$ and $O_2$ controller has been designed for use in controlled atmosphere produce storage in shipping containers.

The unit has two transducers. The $CO_2$ transducer is a thermal conductivity cell, it has four resistive filaments in a bridge configuration. The cooling effect of $CO_2$ gas causes a change in the resistance of one of the filaments, this change is proportional to the % $CO_2$ present. The $O_2$ fuel cell generates a potential difference proportional to the amount of $O_2$ present.

Figure 8A:
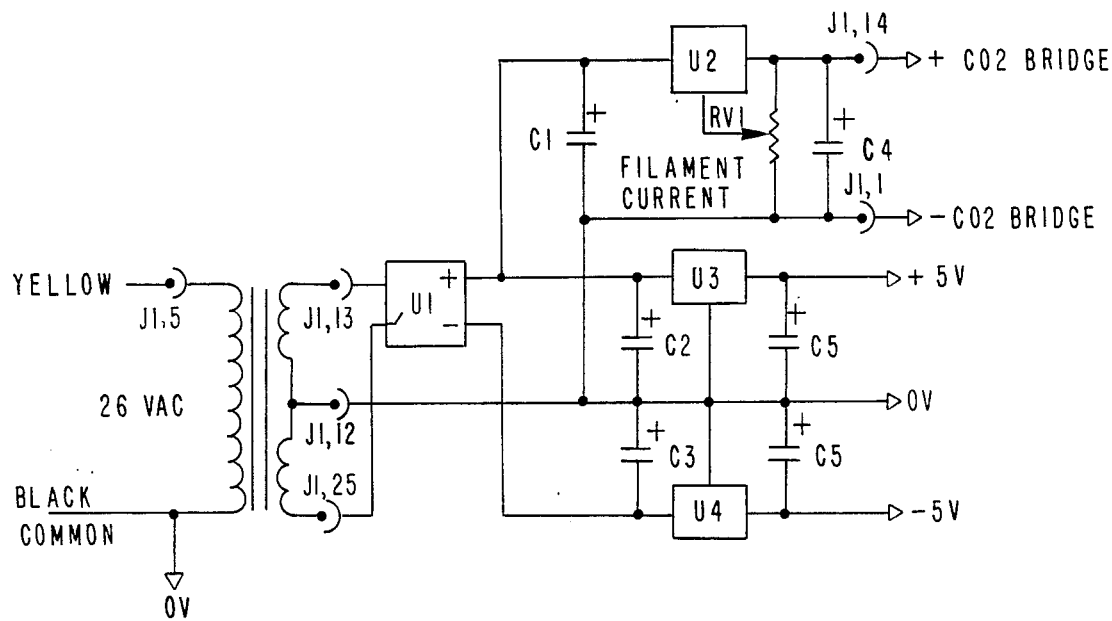
Figure 8B:
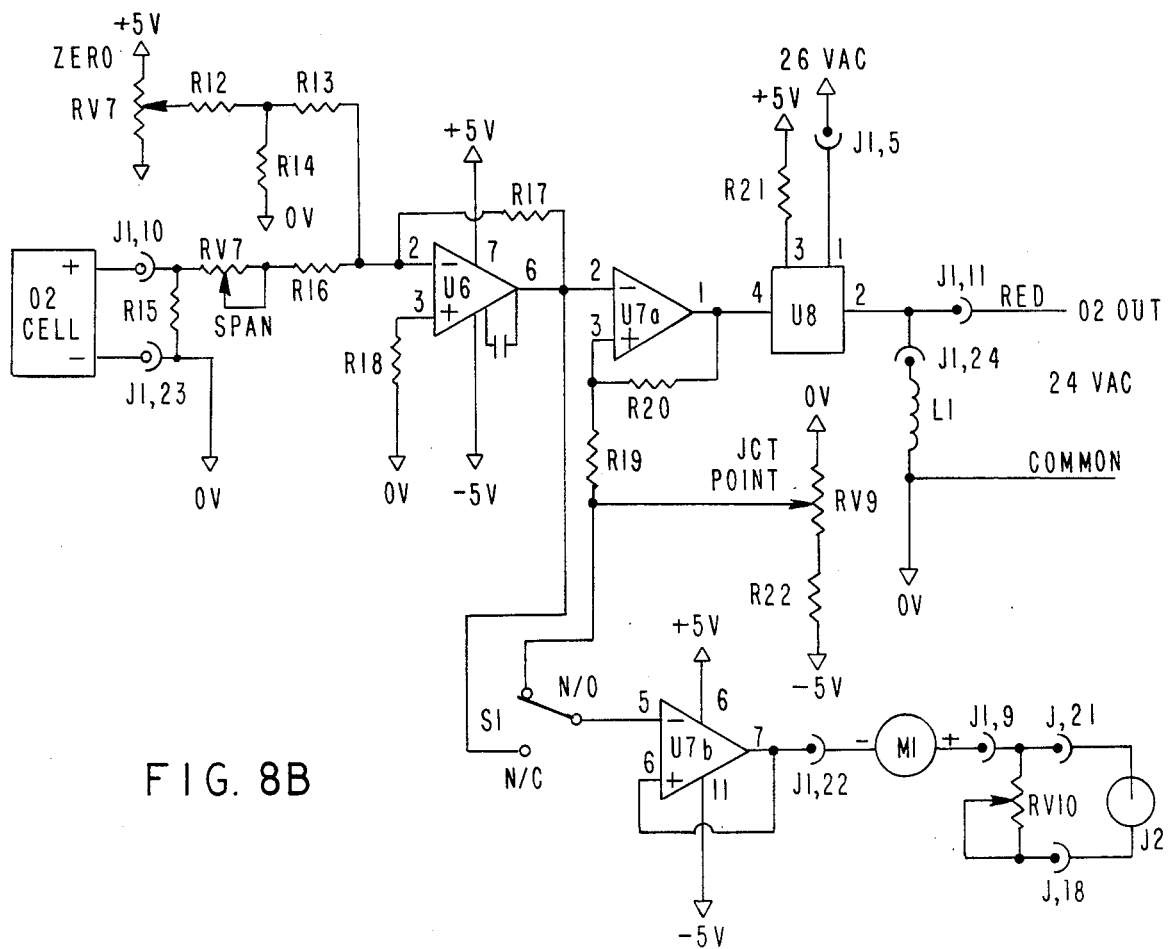
Figure 8C:
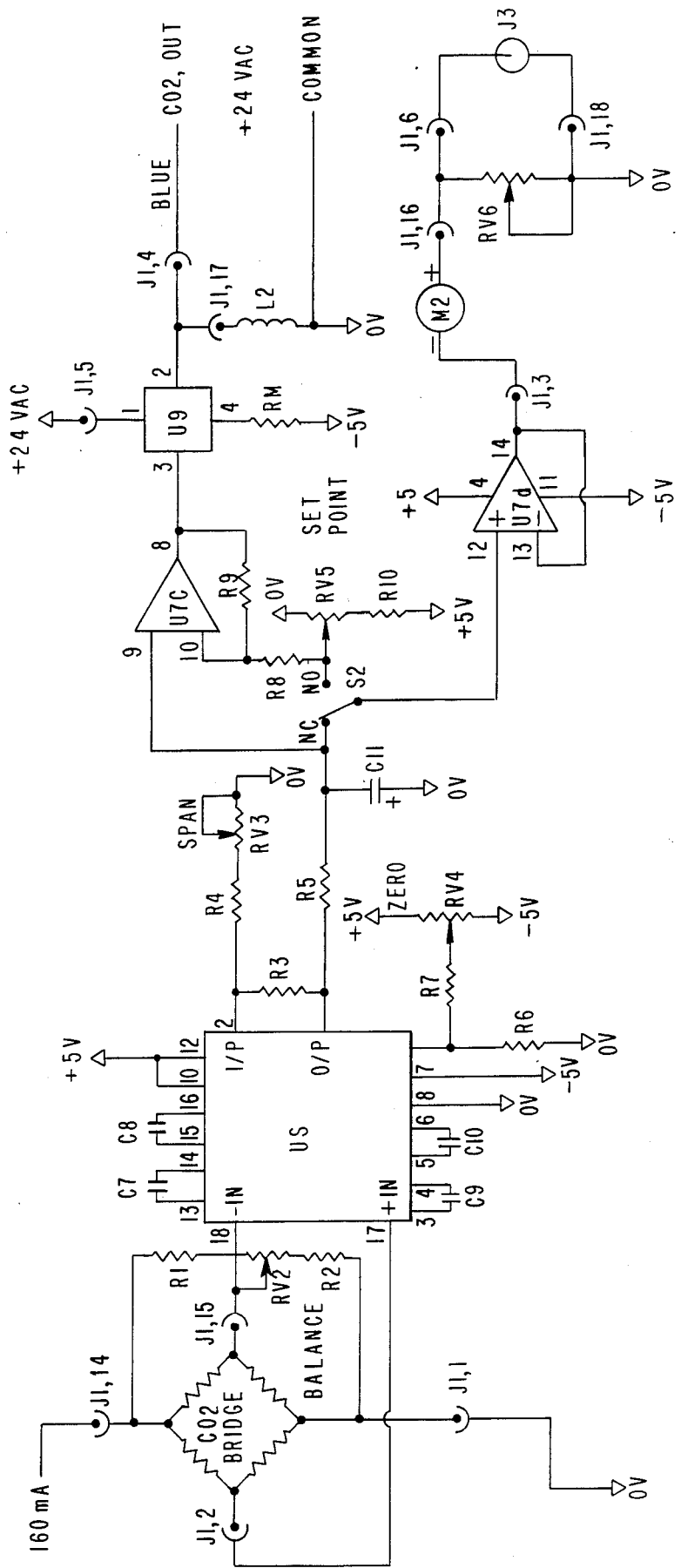

The controller can be set for the desired levels of $O_2$ and $CO_2$ and will maintain this set level by simple on-/off control of a series of solenoids (see FIG. 8) around the container.

Figure 9:
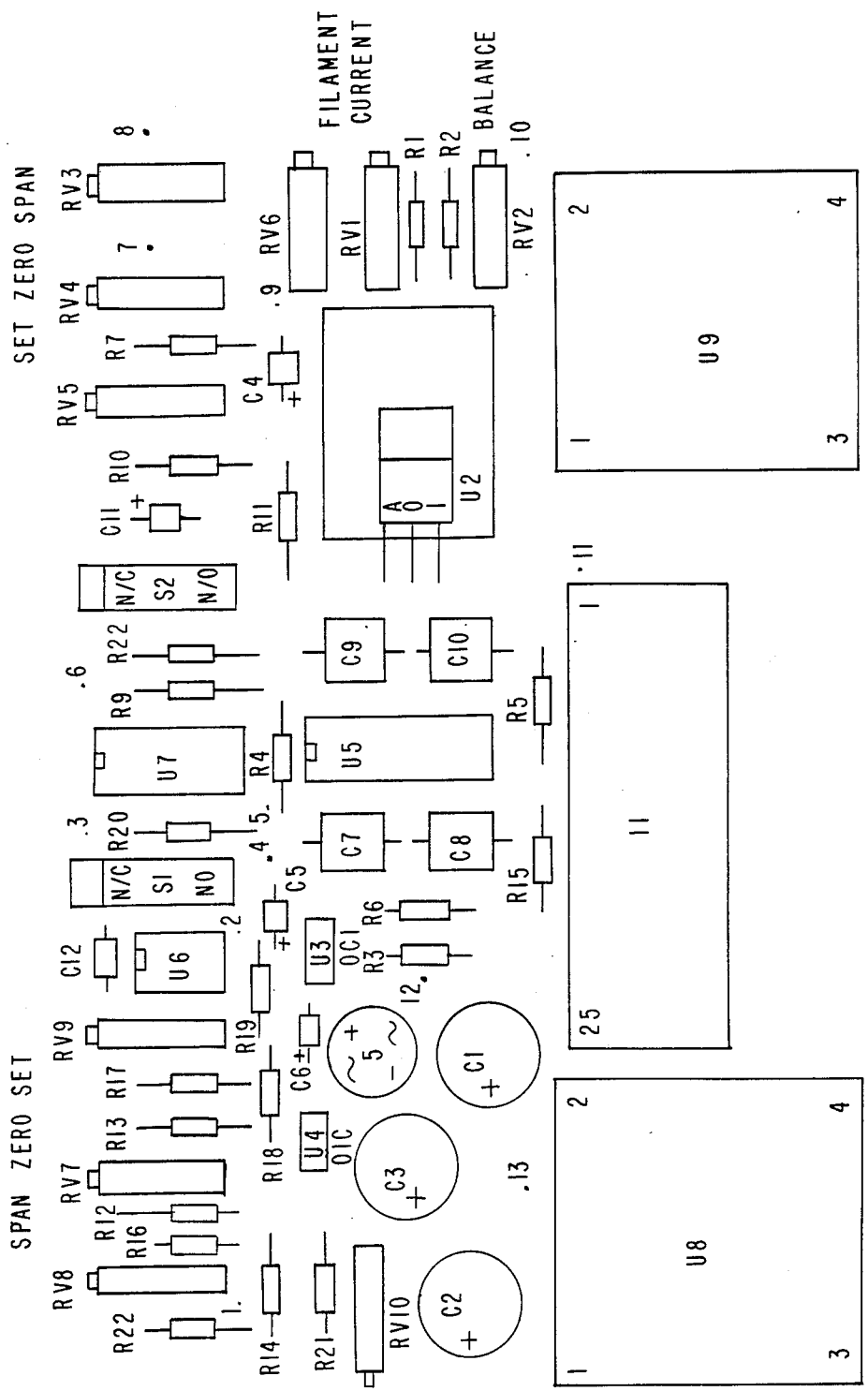
FIG. 9 is a diagram of the controller layout.

CIRCUIT OPERATION (a) Power Supply: Refer to FIG. 9. The controller transformer has a 24 V primary and 7,0,7 centre tap secondary. It is 7 VA at 450 mA. The A.C. is full wave rectified by a diode bridge IC1 RB155 to give a bipolar supply with respect to the centre tap. This is then filtered by $C_2$ and $C_3$ and regulated to +5 volts (IC3, LM7805) and −5 volts (IC4, LM7905). The capacitor C1 and regulator IC1 (LM317) provide a constant current source for the $CO_2$ bridge. The bridge current is set to 180 mA by adjustment of the cermet RV1.

(b) CO2 Control Circuitry: The resistors R1, R2 and the cermet RV2 are for balancing the bridge. The signal across the bridge provides a differential input to a CAZ amplifier (Commutating Auto Zero) (IC5, ICL7605 Pins 17,18). This amplifier was selected for its excellent stability and sensitivity.

The CAZ amp. references the differential input signal to the voltage present on the Auto Zero pin (pin 1). The resistors R6, R7, and cermet RV4 provide zero adjustment for the $CO_2$ meter.

The SPAN adjustment is used to calibrate the meter M2 and adjusts the gain of the amplifier $$G = \frac{R3 + R4 + RV3}{R4 + RV3}.$$

The negative output of the CAZ amp. (pin 9) is low pass filtered by R5 and C11 to filter out the commutation spikes.

A comparator IC7.3, with approx. 50 mV of hysteresis (R8 and R9), compares the amplified signal level (pin 9) with a negative voltage (pin 10) set by the SET point cermet RV5. As the $CO_2$ concentration increases the $CO_2$ voltage level becomes more negative. When this voltage falls below the SET voltage the comparator output (pin 8) switches high.

IC9 is an opto isolated solid state rely. As the comparator output switches high pin 3 is taken positive with respect to pin 4, this switches 24 V AC through to the appropriate container solonoids as well as illuminating the OUTPUT light.

As the $CO_2$ concentration decreases the comparator output will switch low along with pin 3 (IC9). This disconnects the 24 V AC line and switches the OUTPUT light off. IC7.4 is a voltage follower and buffers the set point voltage or the $CO_2$ signal level, depending on the position of the push button switch S2. This voltage causes a current to flow through the meter M2 and generates a voltage at J3. The cermet RV6 sets the voltage on J3 for −100 mV/1% $CO_2$.

(c) O2 Control Circuitry: The signal from the $O_2$ fuel cell is amplified by the uncompensated op. amp. IC6 (LM308). The gain or $$SPAN = \frac{R17}{R16 + RV8}.$$

the op. amp. is configured as inverting summing amplifier and adds in a voltage determined by the ZERO cermet RV7.

A comparator, (IC7.1) with approx 50 mV of hystersis (R19 and R20) compares the amplified signal with a negative voltage set by the SET point cermet RV9. As the $O_2$ concentration increases the $O_2$ voltage level becomes more negative. When this voltage falls below the SET voltage the comparator output (pin 1) switches high, this forces pin 4, IC8 to a potential similar to pin 3 and therefore breaks the 24 V AC line and turns the OUTPUT light off.

As the $O_2$ concentration falls the comparator output will switch low causing the sold state relay to switch the 24 V AC to the appropriate solenoids and to illuminate the OUTPUT light.

IC7.2 is a voltage followers and buffers the SET point voltage or the $O_2$ signal level—depending on the position of S1. This voltage causes a current to flow in the meter M1 and generates a voltage at J2. The cermet RV10 sets the voltage on J2 for −100 m/1% $O_2$.

SETTING UP PROCEDURE (1) Mechanically zero both meters.

(2) Disconnect the two signal arms of the $CO_2$ bridge, place an ammeter in series with the + side of the bridge and adjust RV1 for 180 mA. Reconnect bridge and seal the cermet.

(3) Pass a sample of 0% $CO_2$ gas through the cells and measure the differential voltage at pins 17, 18 IC5. Adjust RV2 for 0V, seal the cermet.

(4) Pass a sample of 0% $O_2$ through the cells and adjust the ZERO cermet RV4 so the meter M2 reads 0.

(5) Pass a sample of 0% $O_2$ through the cells and adjust the ZERO cermet RV7 so the meter M1 reads 0.

(6) Connect a voltmeter to the output BNC J2. With S1 in the SET mode adjust the 02 SET-point cermet RV9 for full-scale deflection on the meter M1. Still in the SET mode adjust RV100 so that the voltmeter reading tends towards −2.5 V, continue adjusting RV10 until the panel meter reads 1% away from full scale. Now alternatively adjust RV9 and RV10 until the panel meter reads 25% and the voltmeter reading is 2.5 V, seal the cermet RV10.

(7) Repeat the above on the $CO_2$ side adjusting RV5 and RV6 until the panel meter reads 20% and the voltage is 2 V. Seal the cermet RV6.

(8) Pass a sample of 20% $CO_2$ through the cells, monitor the voltage on the N/C contact of S2 if the voltage is positive, swap the two signal arms of the bridge. Adjust the SPAN cermet RV3 so that the meter reads 20%. Recheck that the voltage on the output BNC J3 is −2 V.

(9) Pass a sample of air through the cells and check that the voltage on S1 N/C contact is negative. If not swap the fuel cell wires. Adjust the SPAN cermet RV8 so that the $O_2$ meter reads 21%. Check that the voltage on the output BNC J2 is −2.1 V.

(10) Check the $CO_2$ light by setting the $CO_2$ SET-point to 1% and breathing into the cells the $CO_2$ OUTPUT light should turn on at 1½% an off at ½%.

(11) Check the $O_2$ output light by setting the $O_2$ SET-point at 19, breathe out into the cells, the $O_2$ OUTPUT light should come on at 18.5% and off at 19.5%.

Figure 3:
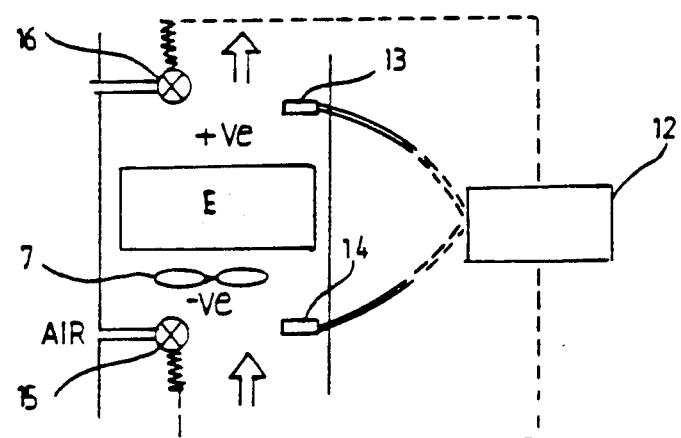
Figure 4:
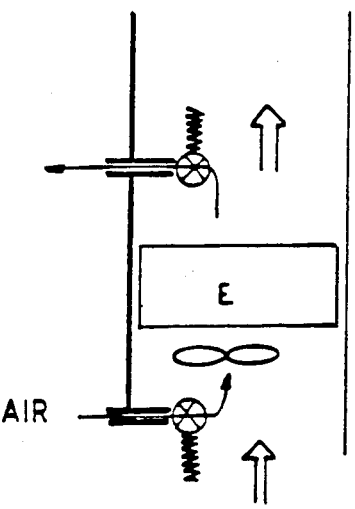

J1 Pin Connections
1 −$CO_2$ bridge green
2 +$CO_2$ in brown
3 −$CO_2$ meter black
4 $CO_2$ out, 24 $V_{AC}$, blue
5 +AC in 24 $V_{AC}$, yellow
6 −$CO_2$ output level, J.3. red
7 NC
8 +$O_2$ output level, J2.0 V green
9 +$O_2$ meter orange
10 +$O_2$ in yellow
11 $O_2$ out, 24 $V_{AC}$, Red
12 OV (transformer) green 13 7VRMS (transformer) blue
14 +$CO_2$ bridge violet
15 −$CO_2$ in grey
16 +$CO_2$ meter white
17 +$CO_2$ light, 24 $V_{AC}$, blue
18 +$CO_2$ output level, J3, OV green
19 NC
20 NC
21 −$O_2$ output level, J2 brown
22 −$O_2$ meter
23 −$O_2$ in OV green
24 −$O_2$ light, 24 $V_{AC}$, red
25 7VRMS orange To understand the oxygen cycle the controller 12 in a manner readily appreciated by a person skilled in the art is connected to a pair of solenoid valves 15 and 16 which preferably operate in unison, i.e. they are simultaneously closed as depicted in FIG. 3 or open as depicted in FIG. 4. In the open condition as indicated in FIG. 4 there is a positive infusion of air from outside of the container into the environment of the container via the port 15 and a displacement out of a corresponding amount via port 16. Such a positive infusion of outside air in order to raise the oxygen level is under the action of the fan 7 which provides the differential necessary. As shown in FIG. 3 just upstream of the fan the pressure is lower than downstream (denoted by the aud-ve respectively). Obviously once the controller 12 detects that the oxygen level is sufficiently high another threshold is met whereupon the valves 15 and 16 would close in unison.

A positive (i.e. forced) infusion of air is under the action of the pressure, positive or negative, on one side only of the evaporator or evaporator/fan assembly. The atmosphere can be exhausted from the container by opening the positive pressure side of the evaporator to the ambient atmosphere thus requiring air to be admitted to the container by the various leakage paths in the sealing system. Alternatively air from the ambient atmosphere can be admitted to the container by opening the low (−ve) pressure side of the evaporator to ambient atmosphere whereupon air is exhausted from the container by the various leakage paths in the sealing system.

In some models of shipping containers, the pressure differential across the evaporator/fan assembly of the refrigeration unit may be insufficient to provide a flow of sampling gas to and from the gas controller. An automatic sampling pump is then incorporated to provide the gas sample.

While the fan 7 can be used to cause the air movement in lieu of the fan 4 depicted in FIG. 5 for the purposes of carbon dioxide scrubbing it may be simpler to provide a separate unit. In that case the carbon dioxide controller, for example 12, would actuate that fan to cause the scrubbing of the environmental gas by the hydrated lime and would stop the fan when an acceptable level has been reached. When the acceptable carbon dioxide level has been reached, the scrubber is sealed from the container atmosphere by valves 17 closing under the operation of the controller. Likewise when fan 4 is operating under the operation of the controller valves 17 open simultaneously.

A person skilled in the art will however appreciate how the carbon dioxide controller could instead control valved ports, for example, in a manner substantially as described in relation to the oxygen control so as to provide the necessary flow through a scrubbing medium for the carbon dioxide without the use of fan 4, but using the differential pressure due to fan 7.

The carbon dioxide sample may be obtained in some containers by using the gas sampling pump previously referred to.

Preferably the required passage of the environment at the dictates of the $CO_2$ monitoring or controlling system is by control of a fan, (if the pressure differential across the container refrigeration fan/evaporator unit is not employed), and or valves, which may be or may not be electrically operated, irrespective of whatever fan is employed).

The monitoring system for oxygen and carbon dioxide may also be a separate unit, transferable between containers, which may be attached to the container physically, with the requisite electrical and gas sampling connections.

It can be appreciated that the scrubbing procedure for controlling carbon dioxide is necessary since as a flushing system using ambient air is being employed to control the oxygen level a similar flushing system using ambient air can not be used for the control of the carbon dioxide level and for this reason the present invention also consists in the control of the carbon dioxide level within a closed environment employing a controller activated by carbon dioxide levels within the environment which activates a positive infusion of gas from the environment through a carbon dioxide scrubber and from there back into the environment.

On the basis of the foregoing therefore it can be seen that there is the prospect of a constant monitoring of the environment so as to enhance the freshness of vegetables or fruits, for example, asparagus, stone fruit, advocados, tamarillos, etc., or fresh meat and/or fish or plants with above freezing refrigeration but for a sufficiently long period, for example, four to eight weeks to enable such produce to be freighted the distances involved from New Zealand.

In a preferred container in accordance with the present invention the degree of seal is such that the system can be controlled. As indicated in the preferred form of the present invention the atmosphere control system depends for it successful operation on the conversion of oxygen to carbon dioxide by the cargo, all fresh fruit and vegetables breath whereas dead products such as chilled meat and fish do not although micro organisms on such comestibles may themselves breath. In the preferred system the space within the sealed cargo system of the container is not completely airtight and is only partially so, air gets in to thereby cause a diffusion inwardly of oxygen and nitrogen and the internal atmosphere can also get out through any small leaks or indeed even by diffusion through the door sealing however if the leakage into the container allows less oxygen to pass in then the product "breaths" then additional oxygen must be let in under control to maintain a specified or predetermined oxygen level. Thus there is provided a system capable of control. Similarly if the production of carbon dioxide is greater than the leakage out to atmosphere than the carbon dioxide must be removed to maintain a preset level. Thus again we have a system capable of control for optium activity therefore there is some need to balance the leak tightness of the sealed container relative to the product activity. In practice it has been found that a level of leak tightness suitable for a product with a low activity should be specified as it is applicable to all cargoes. It should be remembered however the higher the product activity the less gas tight the container has to be. With a view however to ensuring that containers can carry any type of fresh respiring produce a minimum leakage rate is being specified. The actual leakage rate in service over the many days transit time envisaged will also vary due to the ambient atmospheric pressure as leakage will vary with the pressure. Difference between the inside and outside of the substantially gas type space thus the leakage tests we use is not truly "absolute" but is adequate for practical purposes.

For trial purposes to determine the leakage rate of a container the container is fitted with a "Transfresh" doorseal, the defrost and air freshening apertures are sealed and the container is pressurised using compressed air or compressed nitrogen to four inch water guage pressure. This seats the door seal. The pressure within the container is then maintain by using a manometer. The pressure within the container is increased to four inches water gauge or above and the time taken for the pressure to drop to two inches water guage is measured. This provides a measure of the half life of pressure within the container and this decay time should not be below five minutes. To check the system against the actual leakage rate air can be pumped into or out of the container and the volume of air or nitrogen added or substracted measured. This air flow can be adjusted to maintain a pressure or vacuum within the container of half inch water gauge. FIG. 6 shows plotted half life decay time (actually from four inches down to two inches water gauge) in minutes against the flow rate in cubic feet per hour (at half inch water gauge and ambient temperature) which is the actual leakage rate. The preferred leakage characteristics for a 21 foot container is one having a decay time of above five minutes or a flow rate in cubic feet per hour at half inch water guage of less than about 16.

For a standard 40 foot long I.S.O. container (as opposed to 21 foot containers) a satisfactory leakage rate (at ½" water gauge pressure within the container) is estimated to be preferably no more than 32 cubic feet per hour. This should give a half life decay of no less than 3 minute. Please note that FIG. 6 relates to 21 foot I.S.O. containers.

A person skilled in the art will appreciate that the system in accordance with the present invention, especially where both oxygen and carbon dioxide controls are employed have significant advantages over the incompletely controlled systems previously known.

What is claimed is:

1. A shipping container adapted for having a quantity of respiring comestibles selected from plants, fruit and vegetables disposed and sealed therein sufficient to insure that less oxygen from the ambient air can diffuse into the container than is required for respiration by said quantity and sufficient to insure a production of carbon dioxide by said quantity than can diffuse from the container, means to monitor the temperature of the environment within said container, means to monitor oxygen content within said container, means to monitor carbon dioxide content within said container, means responsive to the means to monitor the temperature of the environment within said container to adjust at least downwardly the temperature of the environment towards a predetermined value, means responsive to the means to monitor the oxygen content within the environment of said container to cause a positive infusion of ambient air into said container should the oxygen level within the environment fall below a predetermined value, and means responsive to the means to monitor the carbon dioxide within the environment to cause the passage of gas within the envorinment through means to scrub at least some carbon dioxide from the atmosphere of the environment should it rise above a predetermined value.

2. A shipping container adapted to be substantially sealed against a substantial infusion of ambient air and including a monitoring system for monitoring the oxygen content of its substantially sealed atmosphere and means automatically responsive to said monitoring system for providing a positive infusion of air into the container to raise the oxygen content therein when said oxygen content falls below a predetermined value.

3. A container as claimed in claim 2 further comprising a system for monitoring the carbon dioxide content of the atmosphere within the container and means for automatically scrubbing carbon dioxide from the atmosphere within the container when the carbon dioxide content rises above a predetermined value.

4. The container of claim 3 further comprising a temperature monitoring system for the atmosphere in the container including means responsive to the monitoring system to lower the temperature of said atmosphere.

5. A container as claimed in claim 2 further comprising a temperature monitoring system for the atmosphere in the container including means responsive to the monitoring system to lower the temperature of said atmosphere.

6. A shipping container adapted to be substantially sealed against a substantial infusion of ambient air and including: means for monitoring the oxygen content of its substantially sealed atmosphere and means automatically responsive to said oxygen-monitoring means for providing a positive infusion of air into the container to raise the oxygen content therein when said oxygen content falls below a predetermined value; and means for monitoring the carbon dioxide content of said atmosphere, and means for automatically scrubbing carbon dioxide from said atmosphere within said container when its carbon dioxide content rises above a predetermined value.

7. The container of claim 6 further comprising a temperature-monitoring system for said atmosphere in said container including means for maintaining the temperature of said atmosphere at a predetermined, desired value.

* * * * *